United States Patent
Kirschner

(10) Patent No.: US 11,724,607 B2
(45) Date of Patent: Aug. 15, 2023

(54) MOTOR VEHICLE COMPRISING A CHARGING DEVICE

(71) Applicant: AUDI AG, Ingolstadt (DE)

(72) Inventor: Sebastian Kirschner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 42 days.

(21) Appl. No.: 17/183,011

(22) Filed: Feb. 23, 2021

(65) Prior Publication Data
US 2021/0261004 A1    Aug. 26, 2021

(30) Foreign Application Priority Data
Feb. 24, 2020   (DE) .......................... 102020104736.3

(51) Int. Cl.
| | |
|---|---|
| H02J 7/00 | (2006.01) |
| H02J 7/14 | (2006.01) |
| B60L 53/00 | (2019.01) |
| B60L 53/16 | (2019.01) |
| B60L 53/18 | (2019.01) |
| B60L 53/22 | (2019.01) |
| B60L 53/62 | (2019.01) |
| B60L 53/66 | (2019.01) |
| B60L 53/30 | (2019.01) |

(52) U.S. Cl.
CPC .............. B60L 53/00 (2019.02); B60L 53/16 (2019.02); B60L 53/18 (2019.02); B60L 53/22 (2019.02); B60L 53/305 (2019.02); B60L 53/62 (2019.02); B60L 53/665 (2019.02); H02J 7/00032 (2020.01); H02J 7/0045 (2013.01)

(58) Field of Classification Search
CPC .......... B60L 53/00; B60L 53/22; B60L 53/62; B60L 53/305; B60L 53/665; B60L 53/16; B60L 53/18; H02J 7/00032; H02J 7/0045
USPC ........................................................... 320/104
See application file for complete search history.

(56) References Cited

U.S. PATENT DOCUMENTS

| | | |
|---|---|---|
| 10,046,650 B2 | 8/2018 | Dextreit |
| 2011/0201223 A1 | 8/2011 | Kurumizawa et al. |
| 2012/0303397 A1* | 11/2012 | Prosser ................... B60L 53/18 705/7.12 |
| 2013/0049689 A1 | 2/2013 | Hayashigawa et al. |
| 2013/0193907 A1* | 8/2013 | Thomas .................... B60L 3/04 324/750.3 |
| 2013/0270016 A1* | 10/2013 | Donnell .................. B60L 50/66 180/2.2 |
| 2014/0062396 A1* | 3/2014 | Reddy ................... H02J 7/0048 320/109 |

(Continued)

FOREIGN PATENT DOCUMENTS

| | | |
|---|---|---|
| DE | 10 2011 081 092 A1 | 3/2012 |
| DE | 10 2011 010 809 A1 | 8/2012 |

(Continued)

*Primary Examiner* — Alexis B Pacheco
(74) *Attorney, Agent, or Firm* — Seed IP Law Group LLP

(57) ABSTRACT

A motor vehicle includes a charging device including at least one charging circuit for charging an electrical energy store of the motor vehicle, the charging device comprising a charging unit integrated into the charging circuit, the charging unit being detachably coupled to the motor vehicle and removable from the motor vehicle, and the removed charging unit being connectable to the motor vehicle and operable for charging the energy store.

17 Claims, 2 Drawing Sheets

(56) References Cited

U.S. PATENT DOCUMENTS

| | | | |
|---|---|---|---|
| 2014/0167693 A1* | 6/2014 | Wood | B60L 50/52 |
| | | | 320/109 |
| 2014/0169865 A1 | 6/2014 | Kurumizawa et al. | |
| 2015/0015201 A1* | 1/2015 | Kim | B60L 53/66 |
| | | | 320/109 |
| 2015/0115888 A1* | 4/2015 | Biagini | H02J 7/04 |
| | | | 320/109 |
| 2015/0266535 A1* | 9/2015 | Marioni | B60K 1/00 |
| | | | 180/220 |
| 2016/0137076 A1* | 5/2016 | King | B60L 58/12 |
| | | | 320/108 |
| 2016/0303988 A1* | 10/2016 | Kang | B60L 53/65 |
| 2017/0067746 A1 | 3/2017 | Uei et al. | |
| 2017/0282729 A1 | 10/2017 | Marcos Moreira Da Silva et al. | |
| 2020/0381923 A1* | 12/2020 | Chow | H01M 50/249 |
| 2021/0129697 A1* | 5/2021 | Cho | B60L 53/62 |

FOREIGN PATENT DOCUMENTS

| | | |
|---|---|---|
| DE | 10 2011 107 900 A1 | 8/2012 |
| DE | 10 2011 107 628 A1 | 1/2013 |
| DE | 10 2011 056 501 A1 | 6/2013 |
| DE | 11 2010 005 920 T5 | 7/2013 |
| DE | 10 2014 217 703 A1 | 3/2016 |
| DE | 10 2015 200 960 B4 | 5/2018 |
| DE | 10 2017 110 956 A1 | 11/2018 |
| DE | 10 2018 007 911 A1 | 4/2019 |

\* cited by examiner

MOTOR VEHICLE COMPRISING A CHARGING DEVICE

BACKGROUND

Technical Field

Embodiments of the invention relate to a motor vehicle comprising a charging device including at least one charging circuit for charging an electrical energy store of the motor vehicle, wherein the charging device comprises a charging unit integrated into the charging circuit.

Description of the Related Art

Motor vehicles with an electric drive in general comprise a traction energy store for storing electrical energy by which an electric traction motor of the motor vehicle can be operated. So as to be able to recharge this energy store, the vehicles comprise chargers that are fixedly integrated into the vehicle (on-board chargers, OBC). These chargers are primarily used to charge an energy store of the motor vehicle using alternating current supplied by a terminal on the infrastructure. This alternating current can be converted into direct current by the charger of the motor vehicle, for example so as to charge a traction battery of the motor vehicle. In addition to a power conversion, such a charger can also take over other tasks, such as controlling a charging process and/or communicating with a charging infrastructure. In addition to chargers integrated into the motor vehicle, chargers integrated on the infrastructure side are also known.

DE 10 2015 200 960 B4 describes a charging device for a battery of an electric or hybrid motor vehicle, which comprises a vehicle-external charger including at least one power module for converting alternating current to direct current. One of the power modules can be removed from the charging device so as to be carried in the motor vehicle and used for charging the battery of the motor vehicle.

US 2013/0049689 A1 describes a vehicle-external charging device, which can be connected both to the motor vehicle and to an infrastructure-side energy source and used for charging an energy store of the motor vehicle.

A wall-mountable charging station for direct current charging an electric vehicle is disclosed in US 2017/0282729 A1. This charger comprises a power converter module, which is arranged in the interior of the device. The charger can be operated via a wireless device, such as a mobile telephone.

A charger carried permanently in the motor vehicle has the disadvantage that due to the dead weight of the charger of the vehicle is increased, whereby the energy consumption increases during driving operation, and a range to be achieved by the electrically operated motor vehicle decreases. Conversely, a fixedly mounted charging infrastructure has the disadvantage that it cannot be carried in the vehicle so as to be used to charge the motor vehicle while on the road.

BRIEF SUMMARY

A motor vehicle having an improved charging device, which in particular provides flexible and adaptable charging options, is described herein.

In a motor vehicle of the type mentioned at the outset, the charging unit is detachably coupled to the motor vehicle and removable from the motor vehicle, wherein the removed charging unit is connectable to the motor vehicle and operable for charging the energy store.

A charging unit coupled detachably to the motor vehicle is removable from the motor vehicle when it is not needed for charging the motor vehicle while on the road. The charging unit can thus, for example, be stored in a garage at the residence of a user of the motor vehicle, or at his or her place of work, so as to be able to charge the motor vehicle while it is parked. To do so, it is possible to connect the removed charging unit to the motor vehicle and to use it for charging the energy store of the motor vehicle. The connection is carried out, in particular, so that the charging unit is connected to the charging device again and/or integrated into the at least one charging circuit. The energy store of the motor vehicle to be charged can be a traction energy store of the motor vehicle, and in particular a high voltage battery.

The removability of the charging unit from the motor vehicle shall be understood to mean here a removability of the charging unit which can be carried out in simple and, in particular, tool-less manner and/or without disassembling further vehicle components. This allows the charging unit to be removed from the motor vehicle with little effort. In particular, it is also possible that the charging unit can be inserted into the motor vehicle again, likewise in a simple and tool-less manner, and/or that a removal process and/or an insertion process can be carried out multiple times without the charging unit and/or the motor vehicle incurring notable wear. The removable charging unit is furthermore configured in such a way that it can be connected to the motor vehicle after having been removed, for example by way of at least one cable, and that it can be operated, including after having been removed, for charging the energy store of the motor vehicle, for example when arranged in the surrounding area of the motor vehicle.

In some embodiments, the charging unit comprises a converter, and in particular a single-phase or a poly-phase rectifier. The converter can in particular be integrated into a charging circuit of the charging device designed for alternating current charging. The converter can thereby be configured as a rectifier and, in particular, be designed to convert single-phase, two-phase and/or three-phase alternating current (alternating current, AC) having a phase voltage of 230 V and current intensity of 16 amperes and/or 32 amperes per phase to direct current (direct current, DC). Such a rectifier can, in particular, enable the rectification of the normally used three-phase alternating current, which in many instances is also provided for charging electric vehicles. It is also possible for the converter or rectifier of the charging unit to be bidirectional, so that, in addition to converting alternating current to direct current, it is also possible to convert direct current to alternating current. In addition or as an alternative, the charging unit can also encompass further components of the charging device, for example a voltage transformer. In particular, it may be provided that the charging device, in addition to the converter of the charging unit, does not comprise a further converter designed for a charging process of the energy store.

As a result of the removability of the charging unit, a converter, which can represent the power component of the charging device and, due to the components used, has a comparatively large size and a comparatively high weight, can be removed from the motor vehicle or the charging circuit of the charging device when it is foreseeable that no alternating current charging, that is, charging of the energy store of the motor vehicle by way of alternating current source, is to take place while on the road. This may be the case, for example, during trips that cover distances between 40 km and 60 km, as holds true for the statistically ascertained majority of daily trips. At such distances, it is sufficient, for example, when the motor vehicle is recharged in the evening, for example in a garage. For this purpose, the removed charging unit can be re-connected to the motor vehicle or the charging device, or connected to a charging circuit of the charging device designed for direct current charging.

During a direct current charging process, that is, when charging the energy store of the motor vehicle by way of a direct current source connected to a charging circuit designed for direct current charging, the converter is not required since direct current is already supplied for charging the energy store, and it is therefore not necessary to convert the current. A direct current charging process, for example a rapid DC charging process, can thus still be carried out, even when the charging unit is removed, by way of the charging circuit of the charging device designed for direct current charging. As a result of the removability of the charging unit, the total weight of the motor vehicle can be reduced, and storage space can be created in the motor vehicle for storing other objects, and the charging device can thus be flexibly adapted to the requirements of a user of the motor vehicle. Furthermore, by removing a converter, the vehicle electrical system load or a power consumption in a low voltage network of the motor vehicle can be reduced since the converter no longer has to be supplied with energy, for example for communication purposes, network management or during standstill phases of the motor vehicle, and thus also a quiescent current of the converter no longer occurs. This likewise affects the amount of energy available for trips, thereby likewise increasing the range of the motor vehicle.

According to some embodiments, the charging unit comprises a housing including multiple terminals, wherein the terminals are designed to couple the charging unit to the energy store and/or the charging device, in particular a processing device of the charging device and/or a charging inlet of the charging device. The terminals of the charging unit can be coupled in the process, for example when inserting the charging unit into the motor vehicle, to a correspondingly designed mating piece of the terminal that is arranged on the vehicle and connected to one or more components of the charging device. A terminal and the mating piece thereof can each form a plug connection and/or be designed as a spring contact. The further components of the charging device, which remain in the vehicle even when the charging unit has been removed, can in particular comprise at least one charging inlet. This charging inlet can be a combined charging inlet, which allows both an alternating current source and a direct current source to be connected. It is also possible for the motor vehicle to comprise two separate charging inlets, in particular one charging inlet for alternating current charging and another charging inlet for direct current charging. The charging unit can, for example, be coupled to the energy store by connecting one of the terminals of the charging unit to a corresponding mating piece, which is connected, for example, to a battery junction box (BJB) of the energy store.

An integration into a charging circuit of the charging device can be implemented as a result of the charging unit, in the coupled or inserted state, being connected to the energy store and/or the charging device, and in particular further components of the charging device. For example, when a charging inlet of the charging device is connected to an alternating current source, a rectification of the provided alternating current may be carried out by the inserted charging unit, and the energy store of the motor vehicle can be charged.

According to some embodiments, the terminals are arranged on a bottom side of the housing. This makes it possible to easily couple the charging unit to mating pieces of the terminals, for example, which are arranged on the vehicle. Furthermore, by arranging the terminals on a bottom side of the housing of the charging unit, it can be achieved that the terminals or the mating pieces thereof, when the charging unit is inserted, are protected against inadvertent contact or the like, since they are covered toward the top by the charging unit.

In some embodiments, the charging unit comprises a carrying means, in particular a handle, on the top side of the housing, and/or that at least one socket for the connection to an alternating current source, and/or at least one socket for the connection to a charging inlet of the motor vehicle, are arranged on at least one lateral surface of the housing. Providing a carrying means, such as a handle, arranged on the top side of the housing makes it possible to easily remove the charging unit from the motor vehicle, or to suitably adjust the charging unit during insertion into the motor vehicle and to couple it to the motor vehicle.

At least one socket for connecting the charging unit to an alternating current source can be provided on a lateral surface of the housing, so that the charging unit, when removed, can be connected by way of this socket to an alternating current source, for example an alternating current terminal on the infrastructure side. This alternating current terminal can, for example, be a power outlet providing single-phase alternating current or a power outlet providing three-phase alternating current. It is also possible for more than one socket for the connection to an alternating current source to be provided, for example one socket for use with a single-phase grounding outlet for a 230 V and 50 Hz alternating current and one socket for the connection to a three-phase alternating current terminal (rotary current). Furthermore, at least one socket for the connection to a charging inlet of the motor vehicle can be arranged on the outside of the housing. This socket can be a socket designed to transmit direct current, which can be connected to a charging inlet of the motor vehicle, and in particular to a DC charging inlet or a DC section of a charging inlet. In this way, an alternating current can still be rectified by the removed charging unit arranged outside the motor vehicle, and the direct current thus generated can be transmitted to the motor vehicle for charging the energy store.

According to some embodiments, the charging unit is detachably coupled to the motor vehicle by way of at least one connection that can be opened in a tool-less manner, in particular a detent connection, a clamping connection comprising at least one clamping element, a plug connection and/or a form-locked connection. This allows the charging unit to be removed easily and quickly, which a user of the motor vehicle is able to carry out in a short time and without great effort. Conversely, such a connection makes it possible for the inserted charging unit to be attached in the motor vehicle or to remain stationary even during use of the motor vehicle. In this way, it is achieved that the coupling between the charging unit and the motor vehicle, and in particular the coupling between the charging unit and further components of the charging device, is not interrupted.

For the arrangement of the charging unit at the motor vehicle, in some embodiments, the charging unit is arranged behind a cover of the motor vehicle that can be opened, and in particular beneath a hood of the motor vehicle. In addition to arranging the charging unit beneath a hood of the motor vehicle, it is also possible to arrange the charging unit in a trunk of the motor vehicle, so that the charging unit can be removed after a trunk lid has been opened.

In some embodiments, the charging device comprises a processing device, which is designed to communicate with the coupled or connected charging unit, in particular via a discrete link or a serial bus system. The processing device can communicate with the charging unit both when the unit is inserted in the motor vehicle, and when the charging unit has been removed from the motor vehicle and is connected to the motor vehicle, for example by a charging cable.

The processing device can, in particular, also remain in the motor vehicle when the charging unit is removed, so that the functionality of the processing device, such as the option of carrying out computing operations and/or functions established in the processing device and/or applications, remains available in the motor vehicle, even when the charging unit has been removed. Compared to a converter, for example, which can be removed from the motor vehicle as part of the charging unit, the processing device only has a low weight and a low installation space requirement, so that carrying it in the motor vehicle does not significantly affect the energy consumption or the range to be achieved by the energy stored in the energy store.

The processing device of the charging device can communicate with further processing devices of the motor vehicle and/or be connected to a communication system of the motor vehicle. The processing device can communicate to a connected charging unit via a discrete connection or via a serial bus system, such as CAN, FlexRay, I2C or the like.

According to some embodiments, the processing device is configured to control the charging unit and/or a charging process of the energy store and/or that the processing device is configured to communicate with a charging station and/or a control unit of a charging cable. The processing unit can assume control of the charging unit both in the case in which the charging unit is arranged in the motor vehicle, and in the case in which the charging unit has been removed from the motor vehicle and connected to the motor vehicle. In this way, a control of the charging unit, in particular of a converter of the charging unit can be carried out, and thus an AC charging process of the motor vehicle can be controlled or implemented, by the processing device. As a result of the processing device communicating with a charging station and/or a control unit of a charging cable, for example an in-cable control and protection device (ICCPD), it can furthermore be made possible that, for example, a current intensity of the alternating current withdrawn from the charging station is adapted to the configuration of the charging unit and/or to a specification of the charging cable predefined by the control unit of the charging cable. For example, it can thus be decided whether a current intensity of 16 amperes or 32 amperes per phase is withdrawn.

In some embodiments, the charging device comprises at least one connection device for DC charging the motor vehicle, wherein the or a processing device of the charging device is configured to control a direct current charging process. The connection device can, for example, be a switching device connected to the battery, such as a battery junction box (BiB). The connection device can, in particular, be connected to a charging inlet of the charging device, in particular a DC socket or a section of a charging inlet intended for direct current charging. This makes it possible that the option for direct current charging the motor vehicle remains when the charging unit has been removed. In particular, a converter designed as part of the charging unit is not required during direct current charging. The charging unit can thus control a DC charging process, for example by way of the or a processing device of the charging device, even when the charging unit has been removed. This, in particular, takes into account the fact that primarily direct current charging stations supplying direct current, which in particular allow rapid charging of the motor vehicle, are available for charging while on the road. Carrying a converter for alternating charging in the vehicle can thus be dispensed with, since this is not required for direct current charging while on the road, and the components of the charging device required for direct current charging remain in the vehicle, even when the charging unit has been removed.

According to some embodiments, the charging device is designed to carry out a time-dependent charging process and/or a cost-optimized charging process and/or to control a locking of a charging inlet of the charging device. These functions can, for example, be implemented in the processing device of the charging device. In this way, the functions can be used both during a direct current charging process and during an alternating charging process with a charging unit arranged in the motor vehicle, or with a charging unit that is arranged on the outside and connected to the motor vehicle. The use of a processing device of the charging device which remains in the motor vehicle for controlling these functions has the advantage that no further, redundantly designed processing devices have to be used as an integral part of the charging unit, so that the weight, size and/or costs of the charging unit are not unnecessarily increased. The processing device can be connected to a charging inlet of the motor vehicle, wherein the locking of a charging inlet encompasses the locking and/or unlocking of a cover of the charging inlet and/or the locking and/or unlocking of a plug connected to the charging inlet.

BRIEF DESCRIPTION OF THE SEVERAL VIEWS OF THE DRAWINGS

Further advantages and details will be apparent from the embodiments described hereafter and based on the drawings.

DETAILED DESCRIPTION

Figure 1:
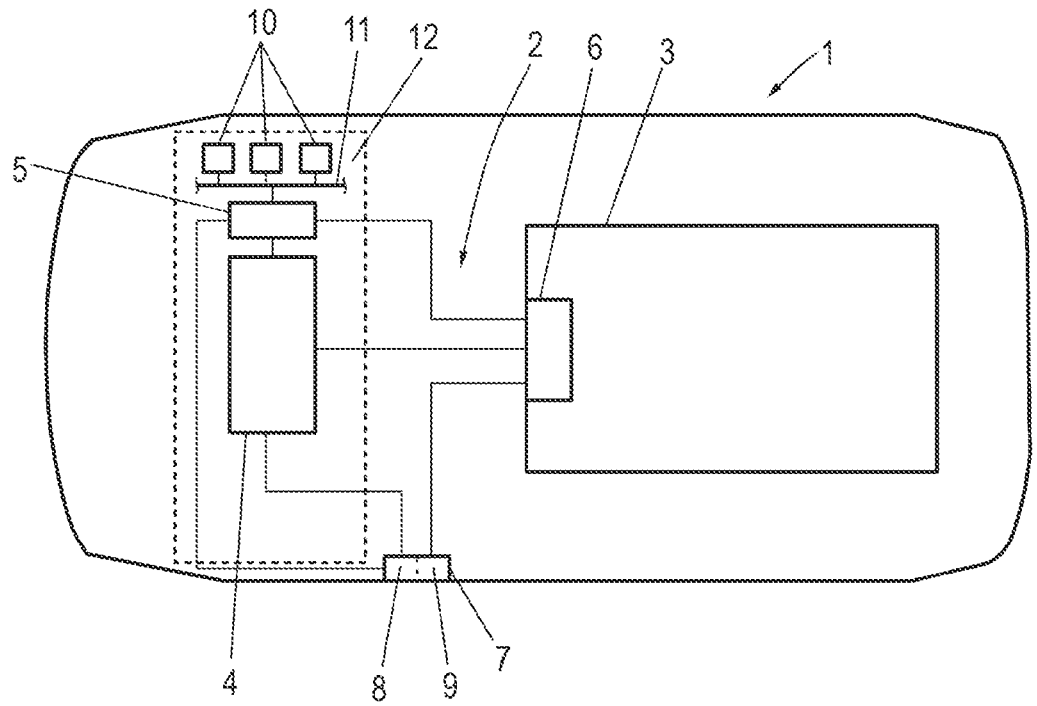
FIG. 1 shows a first embodiment of a motor vehicle, wherein the charging unit is coupled to the motor vehicle.

FIG. 1 shows a top view onto a motor vehicle 1. The motor vehicle 1 comprises a charging device 2, which is used to charge an energy store 3 of the motor vehicle 1 implemented as a high voltage battery. The energy store 3 of the motor vehicle 1 is a traction energy store of the motor vehicle 1, the energy of which is used to electrically drive one or more electric traction motors (not shown) of the motor vehicle 1.

The charging device 2 comprises a charging unit 4, which is integrated into a charging circuit of the charging device 2 designed for AC charging. The charging device 2 is detachably coupled to the motor vehicle 1 and removable from the motor vehicle 1. The charging device 2 furthermore comprises a processing device 5, a connection device 6, and a charging inlet 7. The connection device 6 is implemented as a battery junction box (BJB) in the process, which is connected to the energy store 3. The charging inlet 7 comprises a part 8 designed for AC charging and a part 9 designed for DC charging. The parts 8, 9 of the charging inlet 7 can be implemented as separate charging inlets or as separate sockets, or this may be a single socket which includes multiple contacts, wherein the contacts can be used at least partially for DC charging and/or for AC charging, and thus can represent a part 8 and/or a part 9 of the charging inlet 7.

The processing device 5 of the charging device 2 is connected to the connection device 6, the charging inlet 7 and the charging unit 4. The processing device 5 can furthermore be connected to further processing units 10 of the motor vehicle 1 by way of a bus system 11 shown schematically here, such as CAN, FlexRay, I2C or the like.

The charging unit 4 comprises a converter designed as a rectifier, by way of which an alternating current fed via the part 8 of the charging inlet 7 provided for AC charging can be converted into a direct current for charging the energy store 3. The processing device 5 is connected to the charging unit 4 and can, for example, communicate with the charging unit 4 via a direct link or by a connection of the charging unit 4 to the data bus 11. The charging unit 4, and in particular the converter of the charging unit 4, can be controlled by the processing device 5. In this way, an alternating current charging process of the energy store 3 can be controlled by the processing device 5.

As a result of the connection of the processing device 5 to the connection device 6, furthermore a direct current charging process can also be controlled, in which a direct current is fed into the part 9 of the charging inlet 7 provided for direct current charging and flows to the battery via a connection of this part 9 of the charging inlet 7 to the connection device 6. In addition to purely controlling the charging processes, it is also furthermore possible for at least one function, such as a time-dependent charging process, a cost-optimized charging process or the like, to be implemented by the processing device 5 during direct current charging and/or during alternating current charging. In addition, it is possible that the processing device 5 can carry out further functions, such as locking or unlocking the charging inlet 7 of the motor vehicle 1.

When the charging unit 4 is inserted into the motor vehicle and coupled to the further components of the charging device 2, the motor vehicle can be charged on the road both by way of an alternating current source and by way of a direct current source. During charging by way of an alternating current source, the alternating current delivered to the motor vehicle is converted by the converter of the charging unit 4 to a direct current for charging the energy store 3. Since such a function is not always required due to the availability of direct current sources, the charging unit 4 can be removed from the motor vehicle 1. In this way, the motor vehicle weight can be reduced, in particular by the weight of the converter of the charging unit 4. In addition, it is also possible to avoid an energy consumption of the charging unit 4 in the idle state of the charging unit 4. Both effects thus positively impact a range to be achieved by the motor vehicle 1.

The charging unit 4 is arranged beneath a hood 12 (shown with dotted lines here) of the motor vehicle, so that the charging unit 4 can be easily removed from the motor vehicle after the hood 12 has been opened. The charging unit 4 can thus be accessed directly after the hood 12 has been opened and, as a result of an attachment of the charging unit 4 to the motor vehicle, can be removed easily and with little effort via at least one connection (not shown here) that can be opened in a tool-less manner. The connection that can be opened in a tool-less manner can, for example, be implemented as a detent connection, as a clamping connection comprising at least one clamping element, a plug connection and/or as a form-locked connection.

Figure 2:
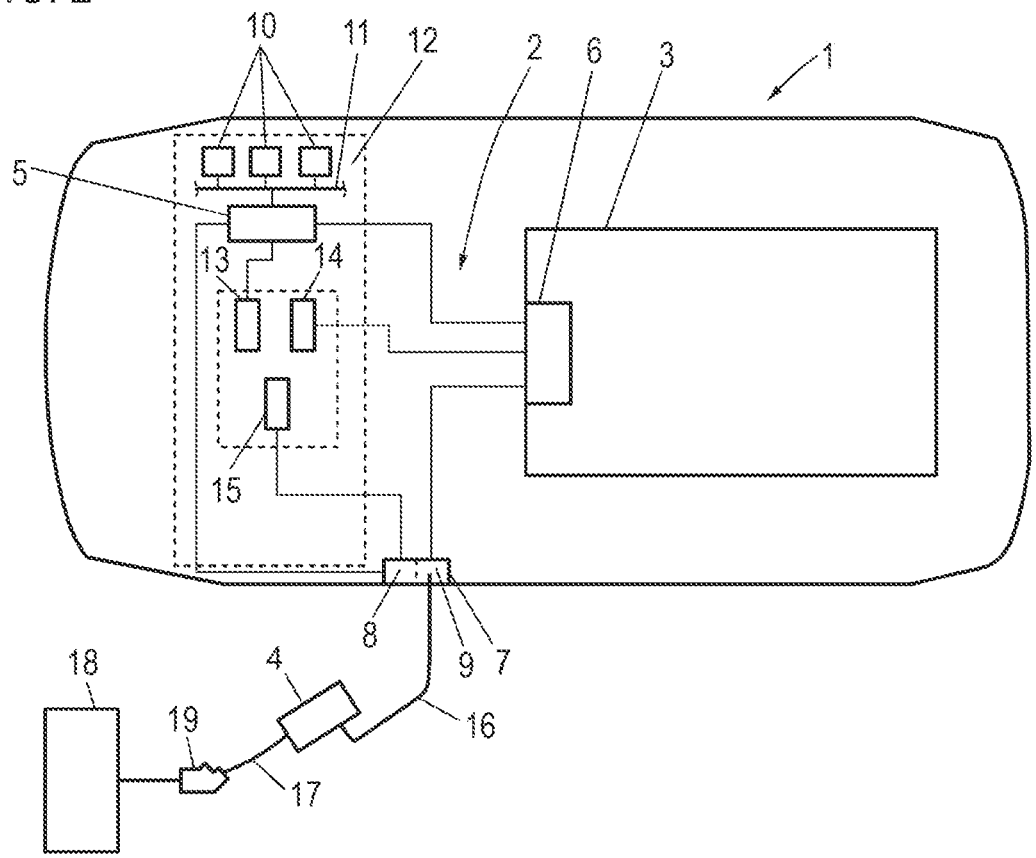
FIG. 2 shows the motor vehicle of FIG. 1, wherein the charging unit has been removed from the motor vehicle.

FIG. 2 shows a top view onto the motor vehicle 1, in which the charging unit 4 has been removed. This is indicated by the outline of the charging unit 4, shown now with dotted lines. It is apparent that the charging device 2 of the motor vehicle 1 comprises three mating pieces 13, 14, 15 for terminals arranged on the bottom side of the charging unit 4. In the process, the mating piece 13 is connected to the processing device 5, the mating piece 14 is connected to the connection device 6, and the mating piece 15 is connected to the part 8 of the charging inlet 7 provided for AC charging. By way of the mating pieces 13, 14, 15, a connection of the charging unit 4, when inserted, to the processing device 5, to the connection device 6 and to the charging inlet 7 is made possible.

In the shown state in which the charging unit 4 has been removed, furthermore DC charging of the motor vehicle is possible. For this purpose, a direct current source can be connected to the part 9 of the charging inlet 7 provided for DC charging, wherein the DC charging process can be controlled by the processing device 5 of the charging device 2, as described above. The motor vehicle is thus charged by way of a charging circuit of the charging unit designed for DC charging.

Furthermore, it is possible for the charging unit 4, which has been removed from the motor vehicle, to be arranged outside the motor vehicle 1 and connected to the motor vehicle 1. The connection between the charging unit 4 and the motor vehicle 1 is established in the process by way of a direct current cable 16, which connects the charging unit 4 to the part 9 of the charging inlet 7 provided for direct current charging. The charging unit 4 is furthermore connected by way of an alternating current cable 17 to a charging station 18 comprising an alternating current source. The charging unit 4 is thus integrated into the charging circuit of the charging device 2 designed for direct current charging. It is also possible to use a combined charging cable, designed to transmit direct current and to transmit alternating current, as the direct current cable 16 and/or as the alternating cable 17. The direct current cable 16 and the alternating cable 17 are furthermore designed to transmit communication signals.

So as to control an alternating current charging process, the alternating current cable 17 comprises a control unit 19, which is implemented as an in-cable control and protection device (ICCP), for example. Communication between the processing device 5 and the charging unit 4 is possible via the connection of the processing device 5 to the charging inlet 7 and the direct current cable 16. Furthermore, the processing device 5 can also communicate with the control unit 19 of the alternating current cable 17 as well as, via the alternating current cable 17, with the charging station 18. In this way, it is possible, for example, to select and/or adapt the current intensities used for the alternating current charging process as a function of the charging unit 4, the alternating current cable 17 and/or the charging station 18. In this way, the alternating current charging process can be controlled, so that the direct current generated by the charging unit 4 by rectification of the alternating current provided by the alternating current source of the charging station 18 can be used to charge the energy store 3.

Figure 3:
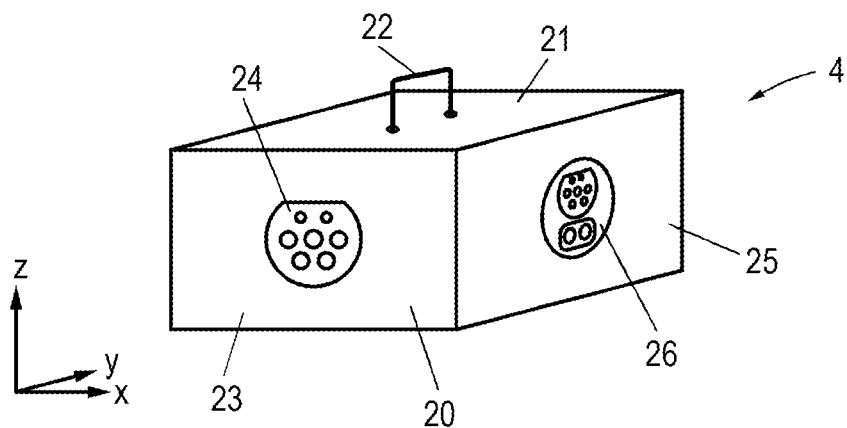
FIG. 3 shows a side view of a charging device of a motor vehicle.

FIG. 3 shows a side view of the charging unit 4. The charging unit 4 comprises a housing 20, which surrounds the converter of the charging unit 4. A carrying means 22, implemented as a handle, is arranged on a top side 21 of the housing, which simplifies the removal of the charging unit 4 from the motor vehicle 1 as well as an insertion of the charging unit 4 into the motor vehicle 1. A first lateral surface 23 of the housing 20 includes an alternating current input of a socket 24 for connecting the charging unit 4 to an alternating current source. A socket 26 for connecting the charging unit 4 to the charging inlet 7 of the motor vehicle is arranged as a direct current output on a second lateral surface 25. In particular, the socket 26 allows the charging unit 4 to be connected the part 9 of the charging inlet 7 provided for direct current charging. The alternating current cable 17 shown in FIG. 2 can be inserted into the socket 24 for the connection to the alternating current source 18. Accordingly, the cable for direct current charging 16 can be inserted into the socket 26 in the charging unit 4. The association of the sockets 24, 26 with the lateral surfaces 23, 25 is shown by way of the example here. It is also possible for the sockets 24, 26 to be arranged on the same lateral surface or on opposite lateral surfaces of the housing 20.

Figure 4:
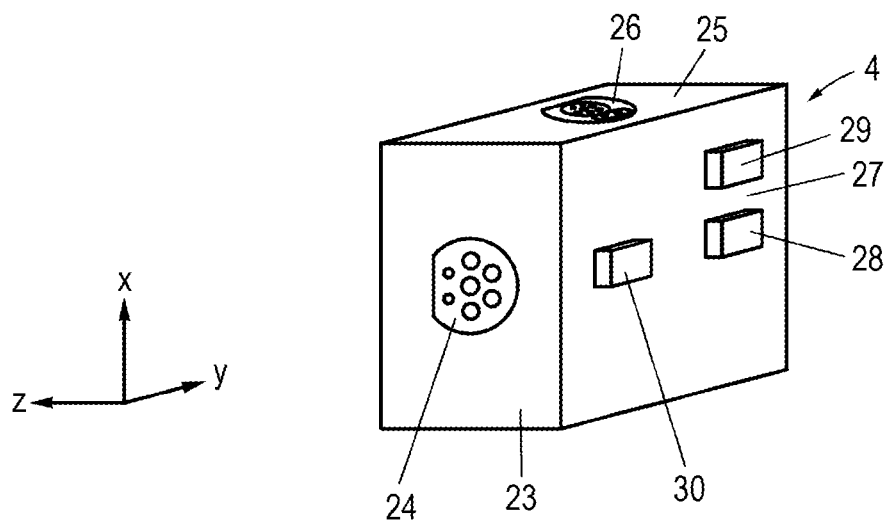
FIG. 4 shows a view of a bottom side of a charging device of a motor vehicle.

FIG. 4 shows a view onto a bottom side 27 of the housing 20 of the charging unit 4. The charging unit 4 comprises three terminals 28, 29, 30, which, when the charging unit 4 is inserted, can be coupled to the mating pieces 13, 14, 15 shown in FIG. 2, for example by way of a respective plug connection, and enable an electrical connection between the charging unit 4 and the charging device 2 of the motor vehicle 1. In the process, the terminal 28 is used to connect the charging unit 4, by way of the mating piece 13, to the processing device 5. Accordingly, the terminal 29 is used for coupling to the mating piece 14 and for connecting the charging unit 4 to the connection device 6, and the terminal 30 is used for coupling to the mating piece 15, and thus for a connection to the charging inlet 7. In this way, the charging unit 4, also when inserted, is integrated into the charging device 2 in such a way that the functionality of the converter of the charging unit 4 is available for alternating current charging even when the charging unit 4 is inserted in the motor vehicle 1.

German patent application no. DE 10 2020 104736.3, filed Feb. 24, 2020, the priority of which is claimed herein, is hereby incorporated herein by reference in its entirety. Aspects and features of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A motor vehicle, comprising:
an electrical energy store;
a charging inlet electrically coupled to the electrical energy store; and
a charging device including:
a charging unit detachably connectable to the charging inlet and removable from the motor vehicle, the charging unit, when disposed inside of the motor vehicle and connected to a first part of the charging inlet, is operable to charge the energy store, and the charging unit, when removed from the motor vehicle and connected to a second part of the charging inlet, is operable to charge the energy store, wherein the first part of the charging inlet is different from the second part of the charging inlet.

2. The motor vehicle according to claim 1, wherein the charging unit comprises a converter.

3. The motor vehicle according to claim 2, wherein the charging unit comprises a single-phase or poly-phase rectifier.

4. The motor vehicle according to claim 1, wherein the charging unit comprises a housing including a plurality of terminals, and at least one of the terminals is configured to connect the charging unit to the first part of the charging inlet.

5. The motor vehicle according to claim 4, wherein the terminals include a first terminal, a second terminal, and a third terminal, wherein the first terminal is configured to couple the charging unit to the energy store, the second terminal is configured to couple the charging unit to a processing device of the charging device, and the third terminal is configured to couple the charging unit to the first part of the charging inlet.

6. The motor vehicle according to claim 4, wherein the terminals are arranged on a bottom side of the housing.

7. The motor vehicle according to claim 6, wherein the charging unit comprises a handle on a top side of the housing, a first socket for connection to an alternating current source, and a second socket for connection to the second part of the charging inlet.

8. The motor vehicle according to claim 1, wherein the charging unit is detachably connectable to the first part of the charging inlet in a tool-less manner.

9. The motor vehicle according to claim 8, wherein the charging unit is detachably connectable to the first part of the charging inlet by a detent connection, and is detachably connectable to the second part of the charging inlet by a plug connection.

10. The motor vehicle according to claim 1, wherein the charging unit is arranged behind a cover of the motor vehicle that can be opened.

11. The motor vehicle according to claim 10, wherein the charging unit is arranged beneath a hood of the motor vehicle.

12. The motor vehicle according to claim 1, wherein the charging device comprises a processing device which, in operation, communicates with the charging unit.

13. The motor vehicle according to claim 12, wherein the processing device, in operation, communicates with the charging unit via a discrete link or a serial bus system.

14. The motor vehicle according to claim 12, wherein the processing device, in operation, controls the charging unit or a charging process of the energy store, and the processing device, in operation, communicates with a charging station or a control unit of a charging cable.

15. The motor vehicle according to claim 1, wherein the charging device comprises at least one connection device for direct current charging the motor vehicle, and wherein a processing device of the charging device, in operation, controls a direct current charging process.

16. The motor vehicle according to claim 1, wherein the charging device, in operation, carries out a time-dependent or a cost-optimized charging process and the charging device, in operation, controls locking of the charging inlet of the charging device.

17. The motor vehicle according to claim 1, wherein the first part of the charging inlet is for alternating current (AC)

charging of the energy store and the second part of the charging inlet is for direct current (DC) charging of the energy store.

* * * * *